United States Patent [19]

Reed et al.

[11] Patent Number: 4,785,654
[45] Date of Patent: Nov. 22, 1988

[54] HANDLING STRIP OR SLAB MATERIAL

[75] Inventors: Geoffrey R. Reed, Tadworth; William R. Laws, Worcester Park, both of England

[73] Assignee: Encomech Engineering Services Limited, Epsom, England

[21] Appl. No.: 916,395

[22] Filed: Oct. 7, 1986

[30] Foreign Application Priority Data

Oct. 7, 1985 [GB] United Kingdom ............... 8524640

[51] Int. Cl.$^4$ .................. B21B 39/16; B21B 45/02
[52] U.S. Cl. ......................... 72/250; 72/202; 198/836; 226/199; 242/76
[58] Field of Search ........... 72/200, 202, 250, 251, 252; 226/196, 199; 242/76; 198/836, 863

[56] References Cited

U.S. PATENT DOCUMENTS

| 3,046,833 | 7/1962 | Harvey et al. | 226/199 X |
| 3,344,648 | 10/1967 | Gray | 72/202 X |
| 3,740,989 | 6/1973 | Petros | 72/250 |
| 3,924,668 | 12/1975 | Cromeens | 198/836 X |
| 4,343,168 | 8/1982 | Laws et al. | 72/202 X |

FOREIGN PATENT DOCUMENTS 0042656 12/1981 European Pat. Off.
43041 5/1888 Fed. Rep. of Germany.
60-44128 3/1985 Japan.

Primary Examiner—Robert L. Spruill
Assistant Examiner—Steven B. Katz
Attorney, Agent, or Firm—Cushman, Darby & Cushman

[57] ABSTRACT

To protect a heat shield arrangement over a hot-rolling mill, at the entry end of the table contact members of large mass are suspended over the path of the hot material to form a height barrier for distorted material. The members are suspended displaceably from bars on a cantilevered support that leaves one side of the table open for the removal of scrapped material. The bars pass through contoured apertures in the members which permit the members to move in forwards and upwards so that when struck by the material they can lift and can also yield to the frictional force of the material travelling under them. The loading on the cantilevered support is thereby reduced. Reduction in peak loadings also result from mounting the members on an upwardly pivotable cantilever frame and by damping the return movements of the members and/or the frame.

14 Claims, 3 Drawing Sheets

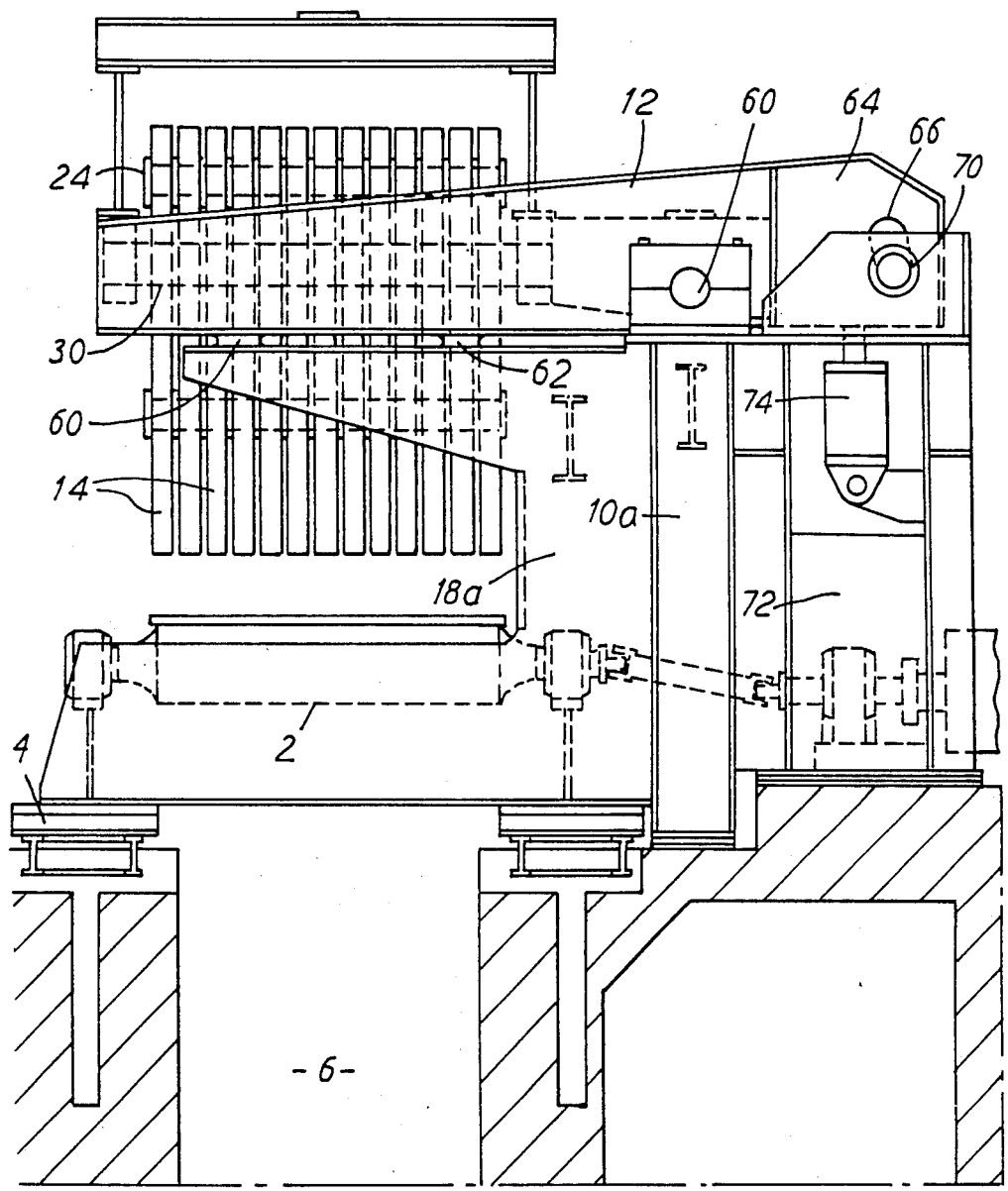

HANDLING STRIP OR SLAB MATERIAL

BACKGROUND OF THE INVENTION

This invention relates to the handling of strip material, which term as used herein includes slabs and like generally planar material. It is concerned particularly, but not necessarily exclusively, with the handling of material in steel processing plant, such as hot strip mills, where the material may require to be progressed along conveying means through successive process stages or to be deposited and held at a particular station between stages.

It is known to provide a heat shield arrangement in a hot strip mill to control the temperature of the strip or slab on a roller table between processing stages. To protect the heat shield arrangement from damage by material that has been distorted to a non-planar state, it is known (EP No. 0042656) to place a reinforced frame or plate guide structure at an entry region of the roller table preceding the heat shield arrangement over the main length of the table, this structure providing an increased-height passage for the introduction of turned-up material. The passage decreases in height as it leads into the main region of the heat shield arrangement where there is a space of limited height between the table and the heat-shielding panels overlying the table. The entry structure has a very robust construction so that it offers considerable resistance to impact and thereby at least partially corrects any turn-up of the entering material that causes the material to contact it with force, so protecting the more fragile heat-shielding panels that follow it.

In such arrangements large shock loads must be accepted by and transmitted from the guide structure to the supporting frame and the adjacent regions of the roller table foundations if it is to be effective in reducing the turn-up of the leading edges of strips.

The problem of accommodating large impact loads from such a barrier becomes especially acute if a clear space is to be left at one side of the roller table, e.g. as an outlet path for scrapped or damaged material. Such a requirement means that the guide structure must comprise a cantilevered support frame and as a result the possible impact loading becomes far more critical. If a protective entry guide structure is to be fitted to an existing installation, it will usually be necessary to secure the cantilever arm rigidly to the base structure of the roller table, which then has the added duty of supporting the full load of the system in operation, but even if the entry guide can be mounted independently, e.g. on cross members extending under the roller table, as may be more easily possible in a new installation, there is a need to limit the effects of shock loads.

SUMMARY OF THE INVENTION

According to one aspect of the invention, there is provided an entry guide structure comprising at least one contact member of large mass suspended above the material path from mounting means on which said at least one member is upwardly and downwardly displaceable, the or each such member having openings with downwardly directed bearer faces through which the member rests on the mounting means, said faces being forwardly and upwardly inclined with a major portion at an angle less than 45° to the horizontal. The rest position of the mounting means is thus at a forward region of such a face and from that rest position said at least one contact member is obliquely movable forwardly and upwardly relative to said material path, whereby it is freely displaceable in said oblique direction when struck by the material entering onto the supporting means. With such an arrangement, the means of mounting the contact mass are specifically arranged to leave clearance for movement under the action of lifting forces and also substantial horizontal friction force, so that impacts from both sources can be minimised or avoided.

According to another aspect of the invention, there is provided an entry guide structure comprising at least one contact member suspended from a support extending above the material path to form a massive barrier at a spacing above said path, said barrier being upwardly displaceable when impacted by entering material, said at least one contact member engaging its support through at least one inclined bearing face so as to be freely displaceable obliquely forwards and upwards relative to the material path when impacted by material entering said path, and damping means being provided for retarding the rate of descent of said contact member from a raised position of displacement. In this way after said contact member has been lifted by passing material the peak loading imposed on the support frame in its descent is reduced. Preferably said damping means are so connected between said at least one member and a support frame on which said member is suspended, as to allow longitudinal displacements of said member relative to the support frame; such an arrangement can complement the provision of means for permitting free upward and forward movement of the member.

According to a further aspect of the invention, there is provided an entry guide structure in which at least one massive contact member is displaceably suspended over the material path from a cantilevered support whereby the material path at said entry guide is laterally accessible from one side, the contact member or members being upwardly displaceable on said support and the support is mounted on pivot means in a manner permitting its displacement upwards from a normal operating position, in response to upward impact forces on said at least one contact member, in addition to said displacement of the member or members on the support. By such means it is possible to ensure that in the event of a large impact forcing the contact members to travel the full extent of the movement provided for, a limit is set to impact loads that may be transmitted to the support frame.

Embodiments of the invention in its application to a steel hot-rolling mill will be described by way of example with reference to the accompanying diagrammatic drawings.

BRIEF DESCRIPTION OF THE DRAWINGS

FIG. 3 is a rear view of another construction in accordance with the invention.

DESCRIPTION OF THE PREFERRED EMBODIMENTS

Figure 1:
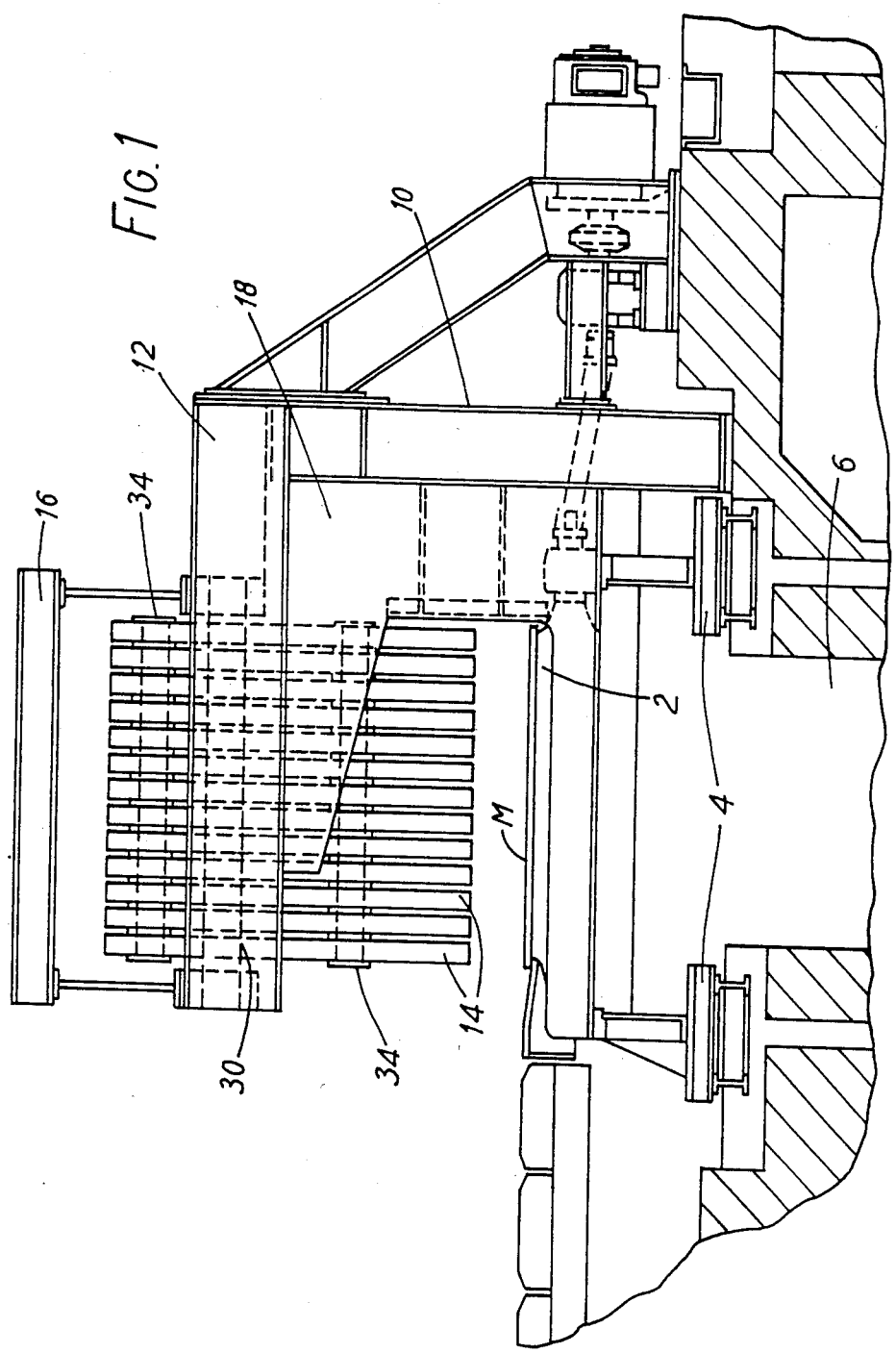
FIGS. 1 and 2 are rear and side views, respectively, of a first construction in accordance with the invention.
Figure 2:
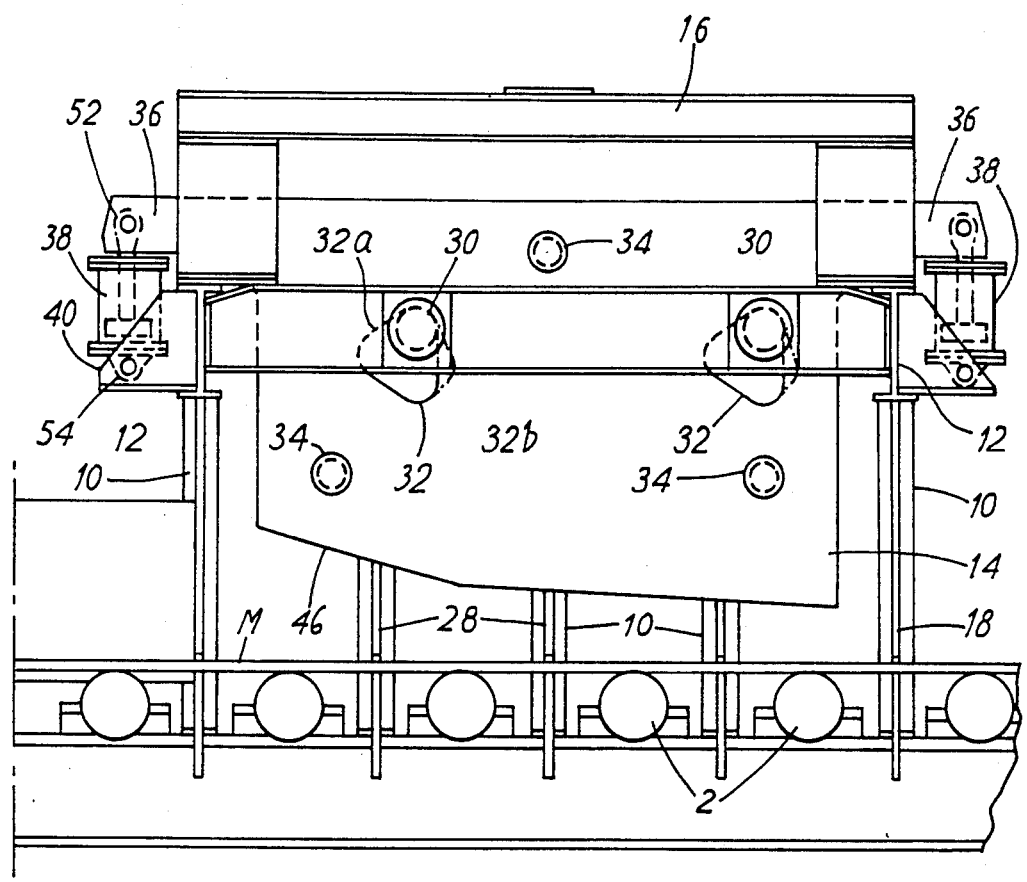

Referring to FIGS. 1 and 2, there is shown a conventional roller table with rollers 2 supported on mountings 4 to span a flume 6 in the foundation works of a hot-rolling mill. Material M enters the table in strip or slab form to travel longitudinally through an entry structure at the beginning of the table before passing into a tunnel-like heat shield (not shown) that surrounds the remainder of the length of the table.

The entry structure comprises a support frame composed of braced pillars 10 at one side of the roller table from which a rectangular sub-frame 12 spanning the longitudinal extent of the pillars projects across the table in the manner of a cantilevered beam to carry a series of steel slabs 14 of large mass suspended side-by-side in parallel over the table. The rigidity of the sub-frame is increased by a top cover 16 extending over the slabs 14. Further strengthening is provided by a series of transverse diaphragms consisting of C-form front and rear diaphragms 18 with top and side limbs welded to the sub-frame and pillars respectively and bottom limbs extending across the flume between rollers, and intermediate L-form diaphragms 28 similarly welded to the pillars 10 and having bottom limbs extending across the flume. The massive slabs 14 are supported on the sub-frame 12 by mounting bars 30 which pass through profiled apertures 32 in the slabs described in more detail below.

Tie rods 34 pass through the steel slabs 14 to hold them as a unit for movements in their own planes as a unitary barrier suspended at a desired height over the roller table. Front and rear extensions 36 of the slabs connect them to dashpots 38 (shown in FIG. 2 only) held on brackets 40 fixed to the sub-frame 12.

The slabs are each of identical form with inclined lower edges 46 that include a first steeper portion and a following portion at a shallower inclination. The slabs present an obstacle to distorted strip entering the table; if the strip has a large turn-up at its leading end this will strike the first, steeper portion of their lower edges and because of the considerable mass of the slabs a correspondingly large reaction force is experienced by the strip tending to flatten the turn-up. The smaller inclination of the following portion of the slab is intended to prevent excess friction causing buckling of the following length of the strip, or to correct strip which has only a small turn-up at the head end. The combined inclinations along the length of the slabs is sufficient to ensure that no strip passes the entry section so distorted that it will damage heat shield panels overlying the following region of the roller table.

The maximum impact forces experienced by the slabs can be expected to exceed their weight although they will be made suitably massive, but such forces are at least largely isolated from the support frame because the apertures 32 in the slabs through which the mounting bars 30 pass allow the slabs to be lifted from the sub-frame 12. The inclined form of the upper rear portion 32a of the slots permits free displacement of the slabs forwardly and upwardly in an oblique direction relative to the material path as they are lifted on impact, i.e., it ensures that none of the impact load is transferred to the support structure despite the fact that the displacing force experienced by the slabs can have a considerable horizontal component due to the movement of the strip along the roller table. The horizontal component can be similar in magnitude to the lifting force of the impact, but the inclination of each upper rear portion 32a of each aperture is substantially less than 45°, so that a horizontal displacement can take place substantially greater than the vertical displacement in order to keep the slabs clear of the mounting bars as they are lifted. The preferred inclination will depend on a number of factors and may vary from one installation to another, but preferably, the profile of the portions 32a is so chosen that they remain close to the mounting bars as the slabs move forwards and upwards. In this way any downwards impact from the fall of the slabs when the strip runs free of them is thereby minimised. The drawings show rectilinear faces 32a, which are relatively convenient to form, but the desired conditions may be more precisely met by slightly curved faces the slope of which reduces towards their lower, rearward ends.

In the illustrated example, the leading face 32b of each aperture extends vertically from the apex of the aperture so that the drop distance is kept to a minimum when the slabs are allowed to fall again. It may be of advantage to incline the front edges of these slots forwards and downwards to facilitate clearing the entry section if, in an extreme case, material becomes jammed under the slabs after the slabs have been lifted to bring the bottoms of the apertures 32 against the mounting bars 30. When the jammed strip is then pulled rearwards the inclination of the front edges would allow the slabs 14 to be more easily lifted by the friction force from the strip.

As a further measure to limit the maximum loading on the support structure, the dashpots 38 are able to control the rate of descent of the slabs from a raised position and so limit any downward impact force. The dashpots are so arranged that the downward fall of the slabs is cushioned while imposing the minimum resistance to upward travel. Since the slabs 14 move longitudinally as well as upwards, the dashpots are connected through pivot connections 52, 54 so that they can rock freely forwards and backwards with the slabs and it will be clear that they also do not hinder forward travel of the slabs.

The example illustrated in FIG. 3 is similar in many respects to the construction already described. In addition, however, the cantilevered sub-frame 12 is now mounted on pillars 10a through a longitudinal pivot 60 so that it can tilt upwards from a normal position in which it rests on bearing pads 62 on the C-frames 18a. The sub-frame has a lateral projection 64 beyond the pivot 60 and an arcuate guide slot 66 in the projection 64 receives a fixed pin 70 on a separate support 72. In the event of a severe impact on the slabs 14 that cannot be wholly countered by the clearances in the apertures 32, the sub-frame 12 can now lift as a whole, keeping the impact load from the pillars and the roller table foundations. A dashpot 74 is preferably connected between the sub-frame and the pillars to cushion the fall of the sub-frame.

Although the arcuate slot 66 will set a limit to the upward pivoting of the sub-frame, it is of a length to ensure its effect will not normally come into operation. Should the fixed pin reach the end of the slot in the rise of the sub-frame a downward impact is delivered to the support 72. However, the support is set further from the roller table and its foundation can be more easily reinforced against impact loads.

Whereas the first example showed the entry structure in combination with a conventional roller table and foundation, illustrating that the invention can be applied to an existing installation, FIG. 3 indicates that when the invention is applied to a new installation it is possible to integrate the entry structure with the roller table support to give additional strengthening to the entry structure. Specifically, as compared with FIG. 1, FIG. 3 shows the end C-frames 18a (and similarly the intermediate L-frames) can have a larger bottom limb adding substantially to their load-bearing capacity. Because of the pivotability of the sub-frame 12 over the C-frames 18a, the top limbs of these of course simply provide bottom supports for the sub-frame, transmitting down loads only.

We claim:

1. In an apparatus for use in handling a strip or slab of material in a rolling mill comprising supporting means for the material, said supporting means having an entry end and a longitudinal travel path provided for the material by said supporting means extending from said entry end, an entry guide structure at aids entry end comprising a support, mounting members secured to said support to extend transversely over said travel path, at least one massive contact member suspended above the material path by said mounting members, downwardly directed faces of said at least one contact member engaging said mounting members, said faces having a dimension in the direction of said travel path substantially greater than the dimension at the engagement of said faces of the mounting members in said direction, each said face being upwardly and forwardly inclined relative to said travel path, at least a major part of the length of said face being at an angle less than 45° to the horizontal, a rest position of engagement with its mounting member being provided at a forward region of said face whereby said inclination of said face provides freedom for oblique movement of said contact member forwardly and upwardly relative to said material path when said member is struck by the material entering onto the supporting means.

2. Apparatus according to claim 1 wherein the or each contact member has a lower edge that is inclined downwardly in the direction of material travel into the entry region.

3. Apparatus according to claim 2 wherein the inclination of the lower edge is greater at an upstream region of the lower edge than at a downstream region thereof.

4. Apparatus according to claim 1 wherein the apertures in said at least one contact member comprise said downwardly directed faces and at least one said aperture has an end face extending from a top region of its downwardly directed face, said end face being downwardly directed at an angular orientation in a range of angle between vertical and an inclination from the vertical in the direction of material travel.

5. Apparatus according to claim 1 wherein said supporting means comprises a pillar structure to one side of the material path, and a cantilever structure extending from said pillar structure over the material path, said at least one contact member being suspended from said cantilever structure, whereby said supporting means and said at least one contact member leave the material path at said entry guide laterally accessible from the side opposite said one side.

6. Apparatus according to claim 5 wherein the cantilever structure comprises at least one upper limb of a C-frame structure having a base limb extending below the material path.

7. Apparatus according to claim 1 further comprising unidirectional damping means connected between said at least one contact member and the support for permitting free movement of said member forwards and upwards but retarding movement in the return direction.

8. In an apparatus for use in handling a strip or slab of material in a rolling mill comprising supporting means for the material and a longitudinal travel path being provided for the material by said supporting means extending from an entry thereof, an entry guide structure at said entry end comprising a support, at least one contact member suspended above the material path by said support to form a massive barrier at a spacing from said path, freedom for relative movement being provided between said at least one contact member and said support, said freedom permitting displacement of said at least one member suspended on said support obliquely forwards and upwards relative to said material path by impact from material entering said path, and damping means connected between said at least one member and the support for retarding the rate of descent of said contact member from a raised position to which it has been lifted by the material entering said path.

9. Apparatus according to claim 8 wherein said support comprises a plurality of mounting members extending transversely over the material path, and said at least one contact member comprises a plurality of apertures through which the mounting members extend, said apertures having upper faces that are inclined upwardly in the direction of movement along the material path.

10. Apparatus according to claim 9 wherein the angle of inclination of said upper faces is substantially less than 45° to the horizontal.

11. In an apparatus for use in handling a strip or slab of material in a rolling mill comprising supporting means for the material and a longitudinal travel path being provided for the material by said supporting means extending from an entry end thereof, an entry guide structure at said entry end comprising a cantilevered support, at least one contact member of large mass displaceably suspended over the material path by said support there being free space in a region immediately beneath said support between the support and said at least one member whereby said member is upwardly displaceable on said support from a freely dependent position thereon, said member and support leaving the material path at said entry guide laterally accessible from one side, pivot mounting means to the opposite side of the material path, said support being upwardly pivotable about said pivot mounting means, whereby the support and said at least one contact member suspended therefrom are jointly displaceable upwards from a normal operating position when subject to an upward force of sufficient magnitude from the material passing the entry guide structure.

12. Apparatus according to claim 11 wherein damping means are connected to the support for retarding the rate of descent of the support from a raised position about said pivot.

13. Apparatus according to claim 11 wherein said at least one contact member is displaceable on said support forwardly and upwardly relative to said longitudinal travel path, and said pivot means has a pivoting axis essentially parallel to said travel path.

14. In an apparatus for use in handling trip or slab material in a rolling mill comprising supporting means for the material and in which a longitudinal travel path for the material is provided by said supporting means extending from an entry end thereof, an entry guide structure at said entry end comprising upwardly extending support means standing to one side of the travel path and a cantilever assembly at an upper end of said support means projecting over said path, horizontal mounting members of said assembly extending transversely across said path, at least one massive contact member having apertures through which said mounting members project to suspend said at least one contact member over the material path to form a height barrier above said path, said apertures being substantially larger than the cross sections of their mounting members to permit upward displacement of said at least one contact member on its mounting members, opposite to said one side of the travel path the material path being laterally accessible below said barrier, each said contact member aperture having an upper face inclined forwardly and upwardly relative to the direction of travel of the material along said travel path and through which said at least one contact member bears on the mounting members, in said displacement of said at least one contact member the relative positions of each mounting member in its aperture thereby comprising a first position in which the mounting member is at a forward and uppermost location in its aperture and a second position in which the mounting member is at a rearmost and lower location, a line joining said first and second locations being at an angle less than 45° to the horizontal whereby the horizontal displacement of said at least one contact member between said locations being substantially greater than the vertical displacement therebetween.

* * * * *